March 19, 1935.  L. E. HURD  1,994,999
MECHANICAL MOVEMENT
Filed May 29, 1934  5 Sheets—Sheet 1

Fig. 1.

Inventor;
Lyman E. Hurd,
by Walter E. Lombard,
Atty.

March 19, 1935.    L. E. HURD    1,994,999
MECHANICAL MOVEMENT
Filed May 29, 1934    5 Sheets-Sheet 2

Fig. 2.

Inventor:
Lyman E. Hurd,
by Walter E. Lombard
Atty.

March 19, 1935.  L. E. HURD  1,994,999
MECHANICAL MOVEMENT
Filed May 29, 1934    5 Sheets-Sheet 3

Fig. 3.

Inventor:
Lyman E. Hurd,
by Walter E. Lombard,
Atty.

March 19, 1935. L. E. HURD 1,994,999
MECHANICAL MOVEMENT
Filed May 29, 1934 5 Sheets-Sheet 4

Fig. 4

Inventor:
Lyman E. Hurd,
by Walter E. Lombard,
Atty.

March 19, 1935.  L. E. HURD  1,994,999

MECHANICAL MOVEMENT

Filed May 29, 1934  5 Sheets-Sheet 5

Inventor:
Lyman E. Hurd,
by Walter E. Lombard
Atty.

Patented Mar. 19, 1935

1,994,999

UNITED STATES PATENT OFFICE 1,994,999

MECHANICAL MOVEMENT

Lyman E. Hurd, Lynn, Mass., assignor to National Development Co., Lynn, Mass., a corporation of Massachusetts Application May 29, 1934, Serial No. 728,108

20 Claims. (Cl. 74—81)

This invention relates to mechanical movements and particularly to mechanism actuated by a constantly rotating shaft adapted to impart a predetermined number of oscillations to a work shaft, discontinue said oscillations during one revolution of the rotating shaft, and then impart another predetermined number of oscillations to said work shaft.

The object of the invention is to provide means whereby the mechanism may be set for any desired number of oscillations of the work shaft, prior to the stand still thereof.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings

Similar characters indicate like parts throughout the several figures of the drawings.

In the drawings is shown a portion of a machine frame 9 provided with a bearing for a work shaft 10 which it is desired to oscillate while the work on said shaft is being operated upon by some form of finishing tool.

This work shaft 10 has secured thereto a pinion 11 which meshes with a gear segment 12 loosely mounted on a fixed stud 13 projecting from said frame.

The stud 13 also has loosely mounted thereon a ratchet 14 having a plurality of teeth 15 at its outer end arranged concentric to the axis of stud 13.

This ratchet 14 is provided with a plurality of holes 16 into either of which a spring-pressed pin 17 is adapted to enter, said pin being mounted on the end of an adjustment plate 18 loosely mounted on stud 13 and having an ear 19 to which is pivotally connected one end of a link 20, the lower end of which is provided with an elongated slot 21 into which projects a pin 22 projecting from a rocker lever 23 mounted on a cylindrical support 24 projecting outwardly from frame 9.

The support 24 may be a fixed stud on which lever 23 is loosely mounted or the end of a shaft forming a part of said machine and to which said lever is fixedly secured.

When the lever 23 is secured to such a shaft an oscillation will be imparted thereto by the rocking movement of said lever 23.

On the inner end of the rocker lever 23 is a hub 25 on which is loosely mounted a bell-crank lever 26 adapted to actuate a pawl mechanism to be hereinafter referred to.

The downwardly projecting branch of the bell-crank lever 26 is pivotally connected to one end of a member 27, the opposite end of which is provided with an annular split band 28 surrounding an eccentric 29 mounted upon an eccentric bushing 30 fixedly secured to a rotatable drive shaft 31 mounted in suitable bearings in the frame 9 and rotated by any suitable means.

Each rotation of the eccentric 29 imparts a complete oscillation to the bell-crank lever 26.

Secured to the shaft 31 is a crank-arm 32 provided with a block 33 adjustable endwise thereof in suitable ways by means of the adjusting screw 34.

As any means for the adjustment of this block 33 may be used it is deemed unnecessary to illustrate the same in detail.

To the block 33 is pivotally connected the lower end of a pitman 35, the upper end of which is pivotally connected to a block 36 by a pin 37, said block 36 being movable lengthwise of an elongated slot 38 formed in the segment 12.

This segment 12 has pivotally connected thereto a dog 39 which normally is retained by a spring 40 with its upper inclined end 41 contacting with the lower inclined face 42 of the block 36, and when in this position each rotation of the crank-arm 32 will impart a complete oscillation to the segment 12 which oscillation will be transmitted to the pinion 11 and effect a complete oscillation thereof.

The travel of the block 36 in the slot 38 may be varied by the adjustment of the block 33 in crank-arm 32 in an obvious manner.

From one edge of the dog 39 extends a projection 43 and in this edge is a locking notch 44.

When the dog 39 is disengaged from the block 36 the locking notch 44 will coact with a finger 45 on a collar 46 immovably secured to the fixed stud 13, and when in this position the segment 12 is locked from movement about the axis of stud 13.

On the ratchet 14 is a radial extension 47 adapted under certain conditions to come into contact with the projection 43 on dog 39 and disengage said dog from the block 36, thus permitting said block 36 to travel along the slot 38 at each rotation of the crank-arm 32 without imparting oscillatory movement to either said segment 12 or the pinion 11 meshing therewith.

Loosely mounted on the stud 13 is one end of a spacer 48, the outer end of which is pivotally connected to a lifting member 49 having pivotally mounted on its upper end a pawl 50 which at times is adapted to coact with the teeth 15 of ratchet 14.

The lower end of the lifting member 49 is pivotally connected to the horizontal branch of the bell-crank lever 26 and said member 49 is reciprocated vertically during the rocking movement of said bell-crank lever.

The spacer 48 limits the movement of the lifting member 49 about its pivotal connection with the lever 26.

The adjustment plate 18 has secured to its outer end a wedge-shaped block 51 having an inclined face 52 with which said pawl 50 in the extreme of its upward movement comes into contact, thereby causing said pawl to be forced into engagement with the ratchet teeth 15.

The lower portion of the pawl 50 is provided with a V-shaped end 53 and has a pin 54 projecting laterally therefrom into an elongated slot 55 in a plate 56 secured to or forming a part of a swinging bar 57 pivotally connected to the outer end of the rocker lever 23, which lever has secured thereto, on the opposite side of the support 24, another swinging bar 58, which is provided at its upper end with an elongated slot 59 into which projects a lateral pin 60 projecting from the side face of swinging bar 57.

A rocking movement is imparted to the lever 23 by these bars 57, 58 when either of said bars 57, 58 are pushed upwardly by the upward movement of the lifting member 49 with which they coact.

The bars 57, 58 are provided respectively with semi-cylindrical notches 61, 62 with which a pair of rounded projections 63, 64 on the upper end of the lifting member 49 are alternately adapted to coact under certain conditions to be hereinafter described.

This lifting member 49 has pivoted to one face thereof a plate 65 pressed upwardly about its pivot by a spring 66 supported on a lug 67 forming a part of said member 49.

This plate 65 is provided with a V-shaped notch 68 with which the V-shaped end 53 of pawl member 50 normally engages when the segment 12 is not oscillating, and when in this position the pawl member 50 is prevented from engaging the ratchet teeth 15.

As before mentioned, the downwardly extending link 20 pivoted to the plate 14 has extending into its elongated slot 21 a pin 22 on the end of rocker lever 23.

This link 20 has an adjusting screw 69 in its lower end with which the pin 22 contacts in its downward movement under certain conditions, thereby causing a downward movement of the ratchet 14 about the axis of the stud 13.

Upward movement of said ratchet 14 is always effected by the upward movement of the pawl 50 while engaging the teeth 15 thereof and the downward movement of said ratchet is effected by the downward movement of link 20.

The ratchet 14 also has secured thereto a brake band 70 which surrounds a brake disk 71 immovably secured to the fixed stud 13, thereby preventing accidental movement to the ratchet 14.

The brake band 70 is provided with means for adjustment thereof in order to obtain the required frictional contact between said disk and band.

By changing the location of the adjustment plate 18 relatively to the ratchet 14 and locking the ratchet 14 and plate 18 together by the insertion of pin 17 in any selected hole 16, any required number of oscillations may be imparted to the segment 12 before the dog 39 is disengaged from the block 36 to permit the free movement of block 36 in slot 38 and thereby discontinue the oscillation of the work shaft 11 while any finished work on said shaft is being removed therefrom and new work placed in position thereon to be subsequently operated upon.

This interruption of the oscillation of the segment 12 lasts during one revolution of drive shaft 31, after which the dog 39 is returned into engagement with the block 36, thus permitting further oscillation of the segment 12 by the crank-arm 32.

The only office that the crank-arm 32 performs is the oscillation of the segment 12 when the dog 39 is engaged with the block 36, said crank-arm 32 rotating idly with the block 36 traveling lengthwise of the slot 38 when the dog 39 is in disengaged position.

All other movements of the ratchet 14, lifting member 49, pawl member 50, swinging bars 57, 58 and link 20, are effected through the rocking movement of the bell-crank lever 26 operated by the eccentric 29.

Figure 1:
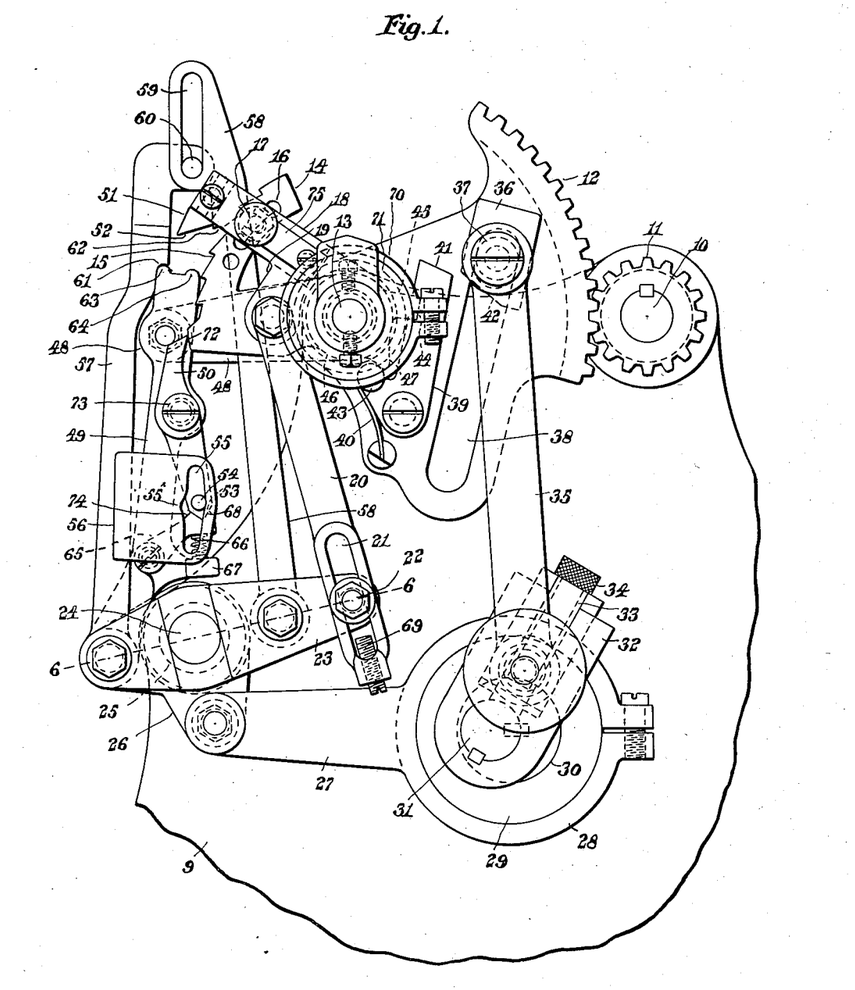
Figure 1 represents an elevation of a mechanical movement embodying the principles of the present invention with the elements in such position that no oscillatory movement will be imparted to the work shaft during the rotation of the drive shaft.

In Fig. 1 the parts are shown in inoperative position, that is, the position when the segment 12, pinion 11 and work shaft 10 are all at a standstill, allowing time for the operator to remove a finished work element and insert in position the new work to be operated upon.

As shown in Fig. 1 the projection 63 of lifting member 49 is ready to enter the notch 61 of the swinging bar 57 and at the first upward movement of member 49 said projection 63 will enter said notch 61 and the continued upward movement of member 49 will cause said swinging bar 57 to be raised with the pin 60 traveling upwardly in the slot 59 of the swinging bar 58.

Figure 2:
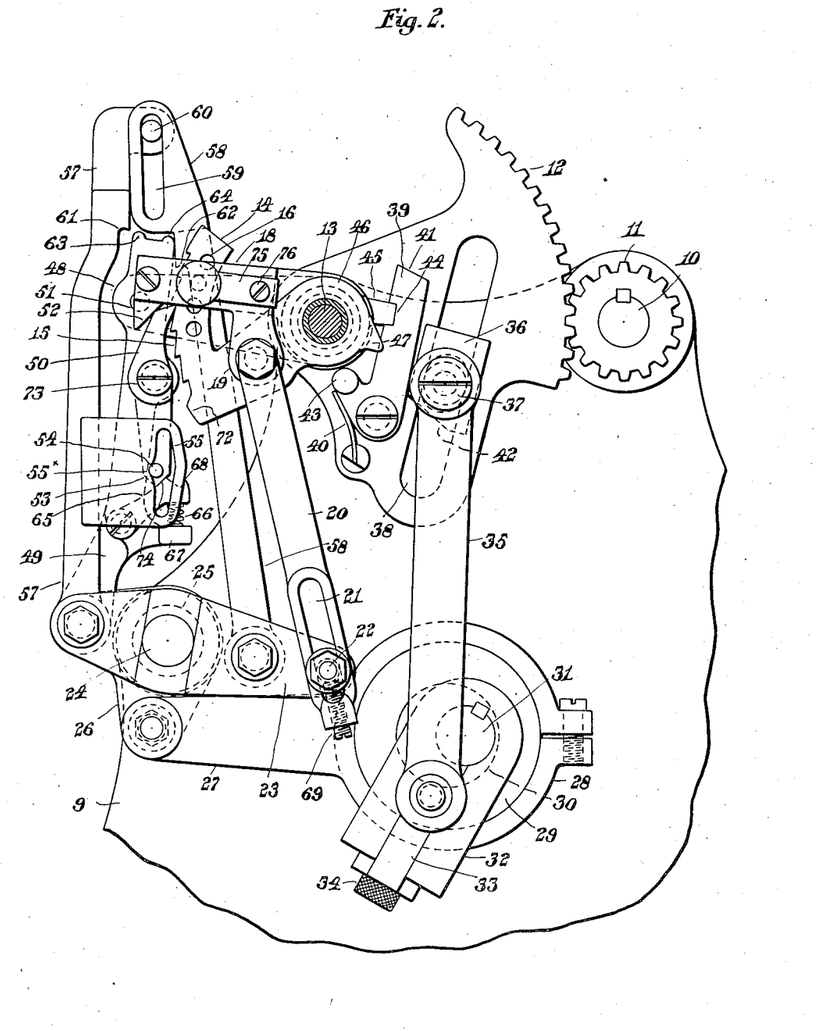
Figure 2 represents a similar elevation with the various elements in the position assumed when the drive shaft has made a half revolution.

As the swinging bars 57, 58 are pivotally connected to the rocker lever 23 on opposite sides of its support 24, it is obvious that when the swinging bar 57 is raised in this manner a rocking of the lever 23 will be effected causing a simultaneous downward movement of the swinging bar 58 leaving the bars 57, 58 in the position shown in Fig. 2.

When the bar 57 has been raised, it will be moved to the left about its pivot by means to be hereinafter described into a position to permit the projection 64 thereon to coact with notch 62 on bar 58, and when the member 49 is raised again the bar 58 will be moved upwardly.

Figure 4:
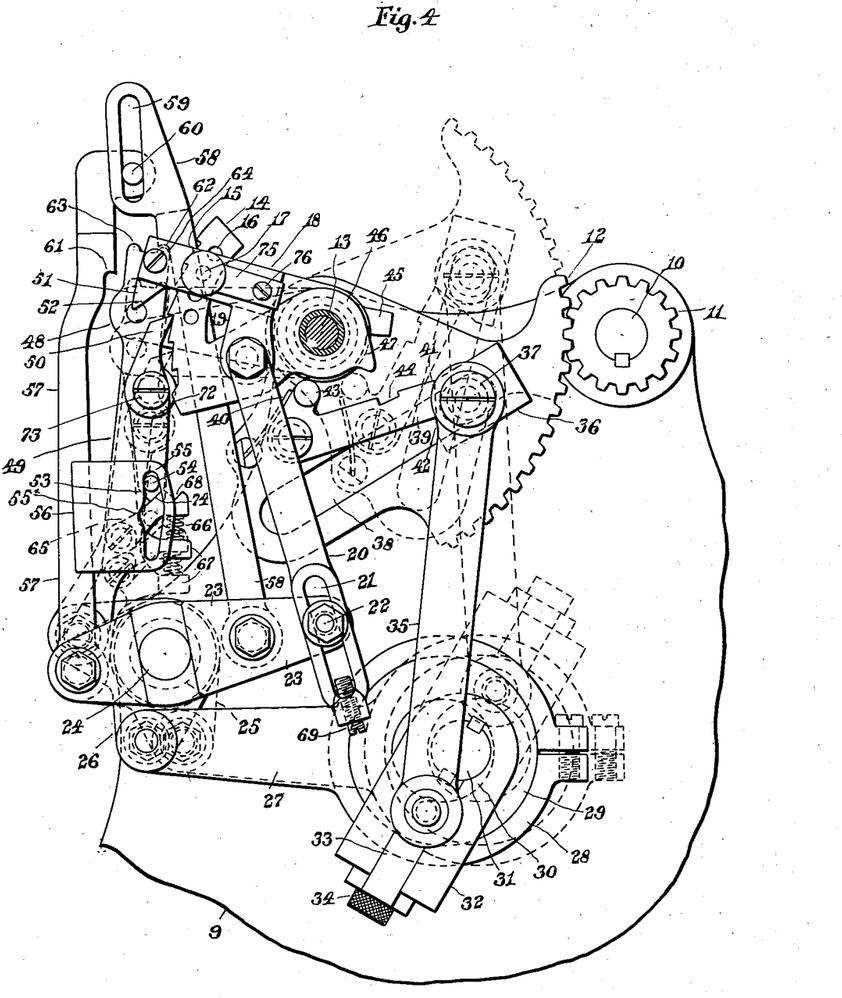
Figure 4 represents a similar elevation with the various elements in the position assumed when another half revolution of the drive shaft has been made and showing in dotted line the elements in the position assumed when another half revolution of the drive shaft has been effected.
Figure 5:
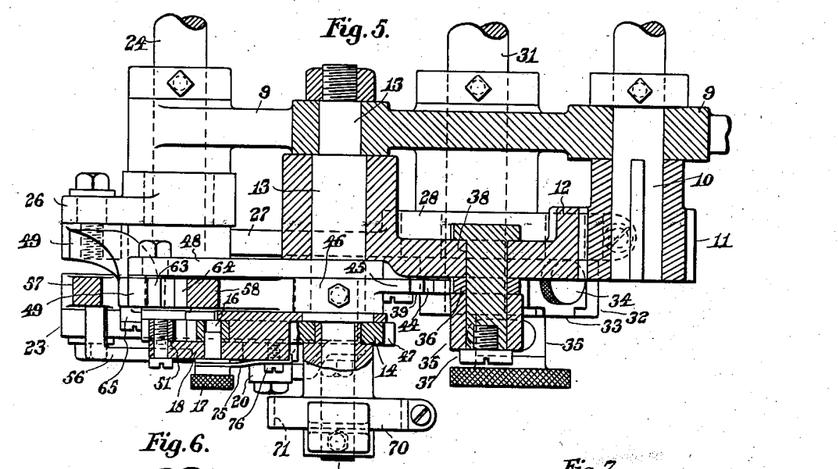
Figure 5 represents a horizontal section on line 5, 5, on Fig. 3.
Figure 6:
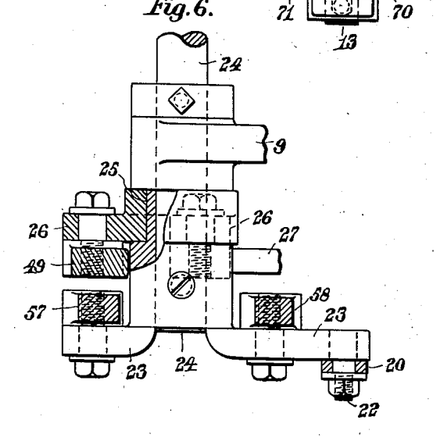
Figure 6 represents a horizontal section on line 6, 6, on Fig. 1.
Figure 7:
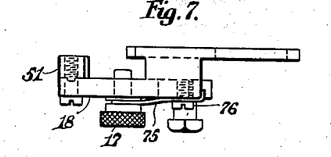
Figure 7 represents a plan of the adjustment plate and parts supported thereby.
Figure 8:
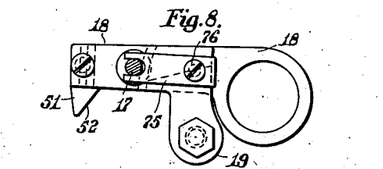
Figure 8 represents an elevation of the same.
Figure 9:
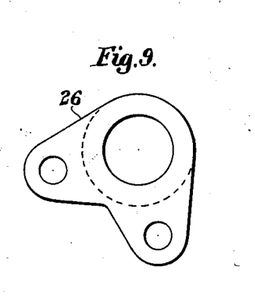
Figure 9 represents an elevation of the bell crank lever.

This upward movement of bar 58 will rock the lever 23 and in so doing lower the bar 57 leaving said bars 57, 58 in the position shown in Fig. 4, in which position said bars 57, 58 will remain until the bar 57 is again raised.

It will be noted that the swinging bars 57, 58 are locked together by the pin 60 extending into the slot 59, thus preventing the separation of the upper ends of these bars 57, 58 while permitting vertical movement relatively to each other.

While thus locked together at their upper ends the bars 57, 58 may swing together about their pivotal connections to the rocker lever 23.

The bell-crank lever 26 may continue to oscillate causing vertical reciprocations of lifting member 49 without imparting any rocking movement to lever 23 until the bars 57, 58 are again moved into their original positions with the bar 57 so disposed that in the next upward movement of lifting member 49 said bar 57 will be engaged by the member 49 and again pushed upwardly.

After the pawl 50, while in engagement with the lowest tooth 15 of ratchet 14, has by the upward movement of member 49 moved said ratchet into its highest position, said pawl 50, on the downward movement of member 49, will be moved onto the high cam surface 72 of said ratchet and forced outwardly about its pivot 73 thereby moving the pin 54 in the opposite direction.

The pin 54 in its movement will move toward and then come into contact with the wall of the slot 55 and as it continues to move in the same direction it will move the bars 57, 58 to the left until the bar 57 is again in position shown in Fig. 1 ready to be raised by another upward movement of the member 49.

At the same time the lower end 53 of the pawl 50 will be moved into the notch 68 of pivoted plate 65, thereby retaining said pawl temporarily disengaged from the teeth 15 of the ratchet 14.

The ratchet 14 being in its highest position, the link 20 pivoted thereto obviously will be in its highest position and the adjustable screw 69 carried thereby will be in the path of the pin 22 on lever 23 in the next downward movement of said pin.

With the various elements in the positions just described, the next upward movement of member 49 will push the bar 57 upwardly and rock the lever 23, thereby moving the pin 22 downwardly against the screw 69 and in its continued movement by means of the link 20 will move the ratchet 14 downwardly into its lowest position, the pawl 50 being retained free from teeth 15 during these movements.

The pin 22 in this downward movement will move a sufficient distance before contacting with screw 69 to permit the block 36 to move downwardly in slot 38 to a position opposite the dog 39 before said dog 39 is released by the movement of the extension 47 away from the projection 43 which is effected by the continued downward movement of pin 22 while in contact with said screw 69.

As soon as the block 36 again reaches its uppermost position the spring 40 will move the dog 39 into a position beneath the block 36, thereby making possible further oscillation of segment 12 by the rotation of crank arm 32.

The ratchet 14 will not be moved downwardly until the pin 22 moves the link 20 downwardly after said pin 22 has contacted with the screw 69, said ratchet being retained at a standstill by the brake mechanism 70, 71.

In the meantime the pawl 50, held free from contact with the teeth 15, is being moved upwardly by the member 49 to which it is pivoted.

As the ratchet 14 approaches its lowest position and the pawl 50 moves upwardly, said pawl 50 will contact with the inclined face 52 of block 51 and be forced about its pivot 73 into engagement with the teeth 15 with its lowest V-shaped end 53 contacting with the inclined face 74 of the pivoted spring-pressed member 65.

While in this position the spring 66 retains the pawl 50 in yielding engagement with the ratchet teeth 15.

When the pawl 50 is moved in this manner about its pivot 73 the pin 54 in its lowest end will move towards and into contact with the outer wall of slot 55 and continuing its movement will move the swinging bars 57, 58 into position to permit the projection 64 of lifting member 49 to coact with notch 62 of the bar 58 and raise the latter at the next upward movement of the member 49.

The outer wall of slot 55 is provided with a curved depression 55x adapted to receive the pin 54 when the pawl 50 is in a position in contact with wedge block 51, as shown in Fig. 2.

At this time the lifting member 49 has come into contact with the edge 58x of bar 58 as shown in said Fig. 2, and is not in position to permit the projection 64 to coact with notch 62.

At the next downward movement of member 49 with bar 57 at a standstill, the pin 54 moving downwardly in contact with outer wall of slot 55 will force the bars 57, 58 further to the left so that the notch 62 will be in position to coact with projection 64 in the next upward movement of lifting member 49.

With the pawl 50 in engagement with teeth 15 the continued rotation of the eccentric 29 and reciprocation of member 49 will cause the pawl 50 to successively engage the ratchet teeth 15 and cause a step by step upward movement of the ratchet 14.

When the lowest tooth 15 has been engaged and caused a final upward movement of the ratchet 14, the next downward movement of the pawl 50 will cause said pawl to ride up on the higher cam surface 72 of said ratchet 14, thus, for a limited time, preventing further movement of the pawl toward the teeth 15.

At this time the extension 47 on the ratchet 14 will have engaged the projection 43 of dog 39 and disengaged it from the block 36 leaving said dog in the position shown in Fig. 1.

Whenever the pawl 50 is on the high point 72 of the ratchet 14, the V-shaped end 53 of the pawl member 50 will be in the notch 68 of the spring-pressed plate 65 and the pawl 50 will be kept disengaged from the ratchet teeth 15 until the ratchet 14 and pawl member 50 have been moved relatively to each other a sufficient distance to cause the pawl 50 to contact with the pawl-tripping block 51 and thus be forced thereby into engagement with the ratchet teeth 15.

When this is done the V-shaped end of the pawl member 50 will be moved out of the notch 68 in the spring-pressed plate 66 onto the inclined face 74 of said plate 65 and held in this position until the pawl 50 is disposed again upon the high point 72 of the ratchet 14.

While the pawl 50 is engaging the ratchet teeth 15 and moving the ratchet upwardly, the swinging bars 57, 58 and rocker lever 23 remain stationary in the position shown in Fig. 4, and the pin 22 on lever 23 disposed in the slot 21 of link 20 also is stationary in said slot while the link 20 moves upwardly without contacting with said pin.

When the pawl 50 moves onto the high point 72 the swinging bars 57, 58 will be forced to the right about their pivots into position to permit the projection 63 to engage again with the notch 61.

At the next upward movement of lifting member 49 its projection 63 being in the notch 61 of swinging bar 57, this swinging bar 57 will be raised again causing the lever 23 to be rocked about the axis of the support 24.

Figure 3:
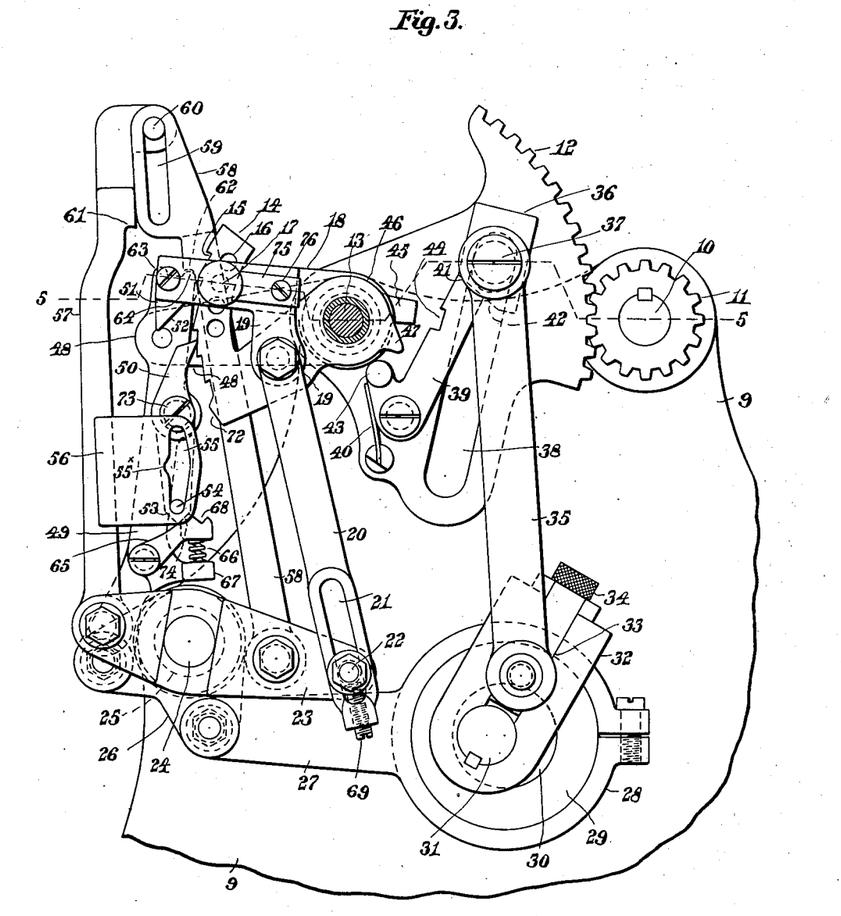
Figure 3 represents a similar elevation with the various elements in the positions assumed when the drive shaft has made a complete revolution and the gear segment is unlocked so that it may be oscillated by the rotation of the crank on the drive shaft.

During this rocking movement of lever 23 the pin 22 thereon will come into contact with the adjusting screw 69 and move the link 20 downwardly into the position shown in Fig. 3, thereby returning the ratchet 14 to its lowest position, as disclosed in said Fig. 3.

As shown in the drawings the locking pin 17 is mounted on the end of a flat spring 75 secured to the adjustment plate 18 by the screw 76 but this mounting of said spring 17 may be of any well known construction.

When the bar 57 has been raised to its highest position and subsequently lowered while the bar 58 is being raised to its highest position, these bars will remain at rest in the position shown in Fig. 4, and consequently there will be no rocking of the rocker lever 23 while the lever 26 continues to oscillate about the axis of support 24 until the required number of oscillations have been completed.

Having made the predetermined number of oscillations of lever 26 as provided for by the insertion of pin 17 in the proper hole 16, the ratchet 14 will be returned to its lowest or starting position and by the means previously described all the elements will be returned to their normal positions as shown in Fig. 1 ready to operate upon another work element when it has been positioned on the work shaft 10.

It is evident, therefore, that means is provided whereby without discontinuing the rotation of drive shaft 31, any required number of oscillations may be imparted to the work shaft 10, the oscillation of the work shaft 10 interrupted during one rotation of drive shaft 31, and then the various elements of the mechanism automatically actuated to obtain another predetermined number of oscillations of said work shaft 10 before further interruption of said oscillations.

It must be understood that the operator having decided the number of oscillations of the work shaft required for operating upon any particular lot of work, sets the adjustment plate 18 for the required number of oscillations and then having placed the drive shaft 31 in operation, the machine to which said mechanism is attached will operate automatically.

The operator of the machine need give no further attention to the operation of the machine, his entire attention being given to placing new work on the work shaft as soon as the finished work has been removed therefrom.

The finished work may be removed from the work shaft either manually or automatically without affecting the present invention.

The present invention may be applied to any kind of a machine in which the work upon a work shaft is acted upon by a tool during the oscillations of said work shaft.

In the cheaper grades of any work mounted upon the shaft 10 and being operated upon, one or two oscillations thereof in contact with a finishing tool is all that is necessary, but in the higher grades of work where a better finish is desired, it is essential that a greater number of oscillations be imparted to the work in contact with said tool.

Heretofore, in machines of this character the work has always received a given number of oscillations, and consequently, when the cheaper work was being operated upon several oscillations were unnecessary and caused a loss of time.

By means of the construction shown in the present application, the number of oscillations of the shaft 10 and work thereon may be controlled by the regulating mechanism for any given grade of work.

Having thus described my invention, I claim

1. The combination of a revoluble shaft; a work shaft; means actuated by said revoluble shaft for imparting oscillatory movement to the work shaft; and mechanism actuated by said revoluble shaft for regulating the number of oscillations of said work shaft and then interrupting said oscillations during one rotation of said revoluble shaft.

2. The combination of a revoluble shaft; a work shaft; means actuated by said revoluble shaft for imparting oscillatory movement to the work shaft; mechanism actuated by said revoluble shaft adapted to be set to regulate the number of oscillations of said work shaft and then cause said work shaft to come to a standstill during the continued rotation of said revoluble shaft.

3. The combination of a revoluble shaft; a work shaft; means actuated by said revoluble shaft for imparting oscillatory movement to the work shaft; and mechanism actuated by said revoluble shaft for regulating the number of oscillations of said work shaft and then interrupting said oscillations during one rotation of said revoluble shaft, said mechanism including adjustable means adapted to be set for any desired number of oscillations.

4. The combination of a revoluble shaft; a work shaft; means actuated by said revoluble shaft for imparting oscillatory movement to the work shaft; mechanism actuated by said revoluble shaft for regulating the number of oscillations of said work shaft and then interrupting said oscillations during one rotation of said revoluble shaft, said mechanism including a pawl and ratchet and means adapted to be set to regulate the number of teeth which may be engaged by said pawl.

5. The combination of a revoluble shaft; a work shaft; means actuated by said revoluble shaft for imparting oscillatory movement to the work shaft; mechanism actuated by said revoluble shaft for regulating the number of oscillations of said work shaft and then interrupting said oscillations during one rotation of said revoluble shaft; and a brake preventing accidental oscillation of the work shaft at the conclusion of a predetermined number of oscillations thereof.

6. The combination of a revoluble shaft; a work shaft; means actuated by said revoluble shaft for imparting oscillatory movement to the work shaft; and mechanism actuated by said revoluble shaft adapted to be set to impart a predetermined number of oscillations to said work shaft, said mechanism including means for discontinuing the movement of said work shaft at the conclusion of said oscillations.

7. The combination of a revoluble shaft; a work shaft; a pinion thereon; a fixed stud; a collar secured thereto and having a finger extending therefrom; a gear segment on said stud meshing with said pinion and having an elongated slot therein; a block movable in said slot; a crank-arm on said revoluble shaft; a pitman between said crank-arm and block; and a spring-pressed dog pivoted to said segment and normally engaging said block to prevent movement thereof in the slot, said dog having a notch therein to receive said finger when said dog is disengaged from said block thereby preventing movement of said segment about the axis of said stud.

8. The combination of a revoluble shaft; a work shaft; a pinion thereon; a fixed stud; a collar secured thereto and having a finger extending therefrom; a gear segment on said stud meshing with said pinion and having an elongated slot therein; a block movable in said slot; a crank-arm on said revoluble shaft; a pitman between said crank-arm and block; a spring-pressed dog pivoted to said segment and normally engaging said block to prevent movement thereof in said slot; said dog having a notch therein to receive said finger when said dog is disengaged from said block thereby preventing movement of said segment about the axis of said stud; and means operable by said revoluble shaft for releasing said dog from said finger and permitting its return into engagement with said block.

9. The combination of a revoluble shaft; a work shaft; a pinion theron; a fixed stud; a gear segment on said stud meshing with said pinion and having an elongated slot therein; a block movable in said slot; a crank-arm on said revoluble shaft; a pitman between said crank-arm and block; a spring-pressed dog pivoted to said segment and normally engaging said block and having a projection thereon; a ratchet loosely mounted on said stud and provided with an extension to engage the projection of said dog and move said dog from the path of said block; and mechanism actuated by said revoluble shaft for imparting a predetermined number of movements to said ratchet about the axis of said stud before releasing said dog.

10. The combination of a revoluble shaft; a work shaft; a pinion thereon; a fixed stud; a gear segment on said stud meshing with said pinion and having an elongated slot therein; a block movable in said slot; a crank-arm on said revoluble shaft; a pitman between said crank-arm and block; a spring-pressed dog pivoted to said segment and normally engaging said block and having a projection thereon; a ratchet loosely mounted on said stud and provided with an extension to engage the projection of said dog and move said dog from the path of said block; a cylindrical support; a bell-crank lever loosely mounted thereon; crank mechanism for oscillating said lever; and a pawl-carrying member pivoted to said lever and adapted to move said ratchet about the axis of said stud.

11. The combination of a revoluble shaft; a work shaft; a pinion thereon; a fixed stud; a gear segment on said stud and meshing with said pinion; means on said revoluble shaft for oscillating said segment; means coacting with said segment whereby the oscillation thereof may be interrupted; an eccentric on said revoluble shaft; and mechanism actuated by said eccentric for controlling the time of said interruption.

12. The combination of a revoluble shaft; a work shaft; a pinion thereon; a fixed stud; a gear segment on said stud and meshing with said pinion; means on said revoluble shaft for oscillating said segment; means coacting with said segment whereby the oscillation therof may be interrupted; an eccentric on said revoluble shaft; and mechanism actuated by said eccentric for effecting a predetermined number of oscillations to said segment and then actuating the interrupting means.

13. The combination of a revoluble shaft; a work shaft; a pinion thereon; a fixed stud; a gear segment on said stud and meshing with said pinion; means on said revoluble shaft for oscillating said segment; means coacting with said segment whereby the oscillation therof may be interrupted; an eccentric on said revoluble shaft; and mechanism including a ratchet and coacting pawl actuated by said eccentric for effecting a predetermined number of oscillations to said segment and then by a final movement of said ratchet actuating the interrupting means.

14. The combination of a revoluble shaft; a work shaft; a pinion thereon; a fixed stud; a gear segment on said stud meshing with said pinion and having an elongated slot therein; a block movable in said slot; a dog pivoted to said segment adapted to lock said block in one end of said slot; a crank-arm on said revoluble shaft; a pitman between said crank-arm and block; means for disengaging said dog from said block whereby the oscillation of said segment may be interrupted; an eccentric on said revoluble shaft; and mechanism actuated by said eccentric for actuating said dog-releasing means.

15. The combination of a revoluble shaft; a work shaft; a pinion thereon; a fixed stud; a gear-segment on said stud and meshing with said pinion; means on said revoluble shaft for oscillating said segment; means coacting with said segment whereby the oscillation thereof may be interrupted; an eccentric on said revoluble shaft; a bell-crank lever actuated by said eccentric; a ratchet loosely mounted on said stud having a plurality of teeth concentric to said stud and provided with means for actuating said interrupting means; a plate loosely mounted on said stud; means for locking the plate to said ratchet in different positions and having a pawl-tripping member at its outer end; a lifting member pivoted to said bell-crank lever; a pawl pivoted to the upper end of said member; means limiting the movement of said pawl-carrying member about its pivot; and means on said pawl-carrying member for moving said pawl into engagement with the ratchet teeth and moving said ratchet about the axis of said stud.

16. The combination of a revoluble shaft; a work shaft; a pinion theron; a fixed stud; a gear segment on said stud and meshing with said pinion; crank mechanism on said revoluble shaft for oscillating said segment; means coacting with said segment whereby the oscillation thereof may be interrupted; an eccentric on said revoluble shaft; a bell-crank lever actuated by said eccentric; a ratchet loosely mounted on said stud having a plurality of teeth concentric to said stud and provided with means for actuating said interrupting means; a plate loosely mounted on said stud; means for locking said plate to said ratchet in different positions, a pawl-tripping member at the outer end of said plate; a lifting member pivoted to said bell-crank lever; a pawl pivotally mounted on the upper end of said lifting member; means limiting the movement of said lifting member about its pivot; and a spring-pressed notched plate on said pawl-carrying member engaging with said pawl to retain it in operative position to impart a step by step movement to said ratchet about the axis of said stud.

17. The combination of a revoluble shaft; a work shaft; a pinion thereon; a fixed stud; a gear segment on said stud and meshing with said pinion; means on said revoluble shaft for oscillating said segment; means coacting with said segment whereby the oscillation thereof may be interrupted; an eccentric on said revoluble shaft; a bell-crank lever actuated by said eccentric; a ratchet loosely mounted on said stud having a plurality of teeth concentric to said stud and provided with means for actuating said interrupting means; a plate loosely mounted on said stud; means thereon for locking the same to said ratchet in different position; a pawl-tripping member at the outer end of said plate; lifting member pivoted to said bell-crank lever; means for limiting the movement of said member about its pivot; a pawl pivotally mounted on the upper end of said lifting member and normally engaging the teeth of the ratchet, said ratchet having at its lowest outer edge a high surface adapted to disengage said pawl from said ratchet; means on said lifting member for retaining said pawl in disengaged position during the downward movement of said ratchet and moving said pawl into engagement with said ratchet in the upward movement of the lifting member to move the ratchet about the axis of said stud.

18. The combination of a revoluble shaft; a work shaft; a pinion thereon; a fixed stud; a gear segment on said stud and meshing with said pinion; means on said revoluble shaft for oscillating said segment; means coacting said segment whereby the oscillation thereof may be interrupted; an eccentric on said revoluble shaft; a bell-crank lever actuated by said eccentric; a ratchet loosely mounted on said stud having a plurality of teeth concentric to said stud and provided with means for actuating said interrupting means; a plate loosely mounted on said stud provided with means for locking the same to said ratchet in different positions; a pawl-tripping member at the outer end of said plate; a lifting member pivoted to said bell-crank lever; means limiting the movement of said member about its pivot; a pawl pivotally mounted on the upper end of said lifting member; said ratchet having at its lowest edge a high surface adapted to disengage said pawl from the ratchet; means for retaining said pawl in said disengaged position during the downward movement of said ratchet; and spring-pressed means on said lifting member for retaining said pawl in engagement with said teeth as it effects a step by step upward movement to said ratchet.

19. The combination of a revoluble shaft; a work shaft; a pinion thereon; a fixed stud; a gear segment on said stud and meshing with said pinion; means on said revoluble shaft for oscillating said segment; means coacting with said segment whereby the oscillation thereof may be interrupted; an eccentric on said revoluble shaft; a bell-crank lever actuated by said eccentric; a ratchet loosely mounted on said stud having a plurality of teeth concentric to said stud and provided with means for actuating said interrupting means; a plate loosely mounted on said stud; means for locking said plate to said ratchet in different positions; a pawl-tripping member at the outer end thereof; a lifting member pivoted to said bell-crank lever; means for limiting the movement of said member about its pivot; a pawl pivotally mounted on the upper end of said member, said ratchet having at its lowest edge a high surface adapted to disengage said pawl from said ratchet; means on said lifting member for retaining said pawl in disengaged position during the downward movement of said ratchet; a cylindrical support; a rocker lever thereon; and swinging bars pivotally connected at their lower ends to said rocker lever and adapted to be alternately raised by the upward movement of said lifting member, said swinging bars being provided with means at their upper ends preventing separation while permitting end movement relatively to each other.

20. The combination of a revoluble shaft; a work shaft; a pinion thereon; a fixed stud; a gear segment on said stud and meshing with said pinion; means on said revoluble shaft for oscillating said segment; means coacting with said segment whereby the oscillation thereof may be interrupted; an eccentric on said revoluble shaft; a bell-crank lever actuated by said eccentric; a ratchet loosely mounted on said stud having a plurality of teeth concentric to said stud and provided with means for actuating said interrupting means; a plate loosely mounted on said stud; means for locking said plate to said ratchet in different positions; a pawl-tripping member at the outer end thereof; a lifting member pivoted to said bell-crank lever; means limiting the movement of said member about its pivot; a pawl pivotally mounted on the upper end of said member, said ratchet having at its lowest edge a high surface adapted to disengage said pawl from said ratchet; means for retaining said pawl in disengaged position during the downward movement of the ratchet; a cylindrical support; a rocker lever thereon; swinging bars pivotally connected at their lower ends to said rocker lever and adapted to be alternately raised by the upward movement of said lifting member, said swinging bars being provided with means at their upper ends preventing separation while permitting end movement relatively to each other; and yielding means on said lifting member for retaining said pawl in engagement with the ratchet teeth during the upward movement of said member.

LYMAN E. HURD.